May 12, 1953   G. BUCKY   2,638,039
AUTOMATIC PHOTOGRAPHIC UNIT HAVING SYNCHRONIZED
SHUTTER AND LIGHT SOURCE
Filed Feb. 4, 1952   2 Sheets-Sheet 1
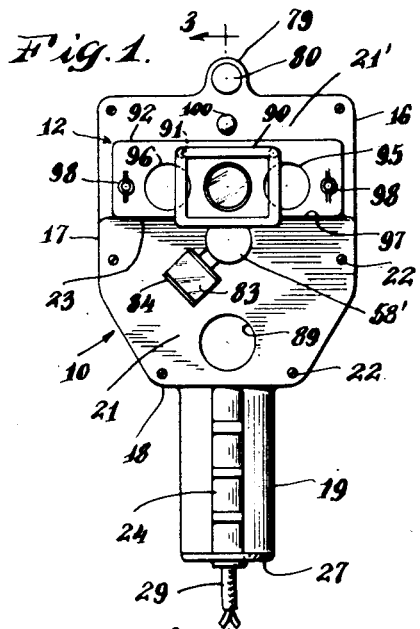
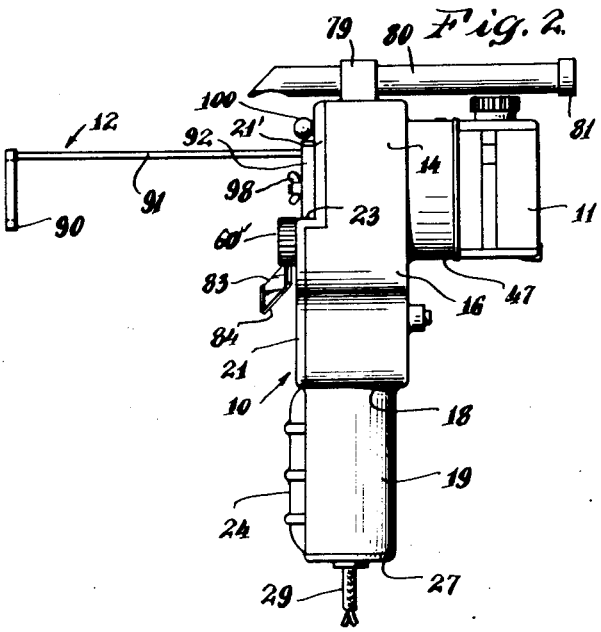
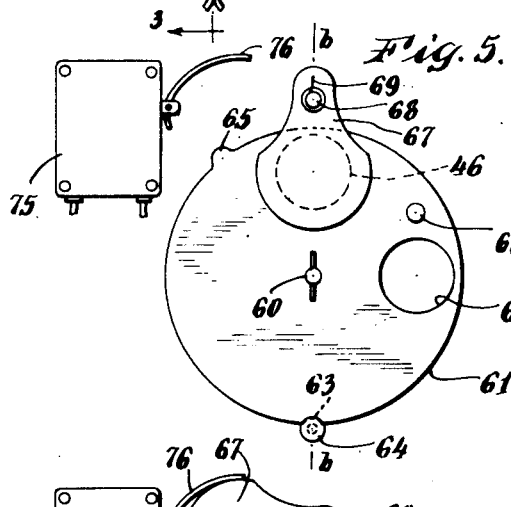
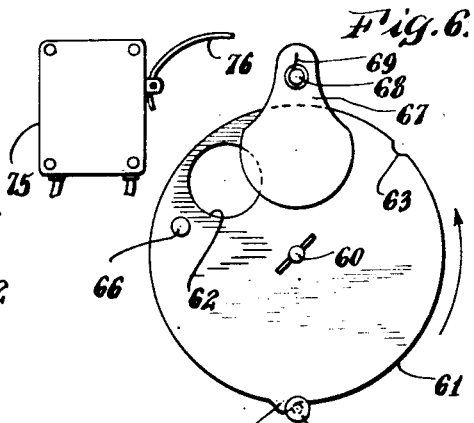
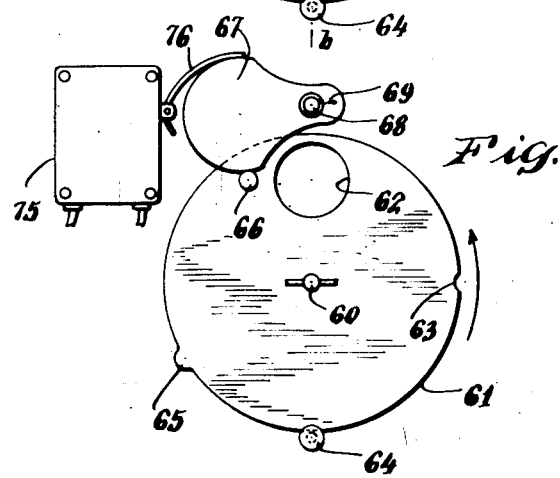
INVENTOR.
Gustav Bucky
BY Walter S. Alston
ATTORNEY.

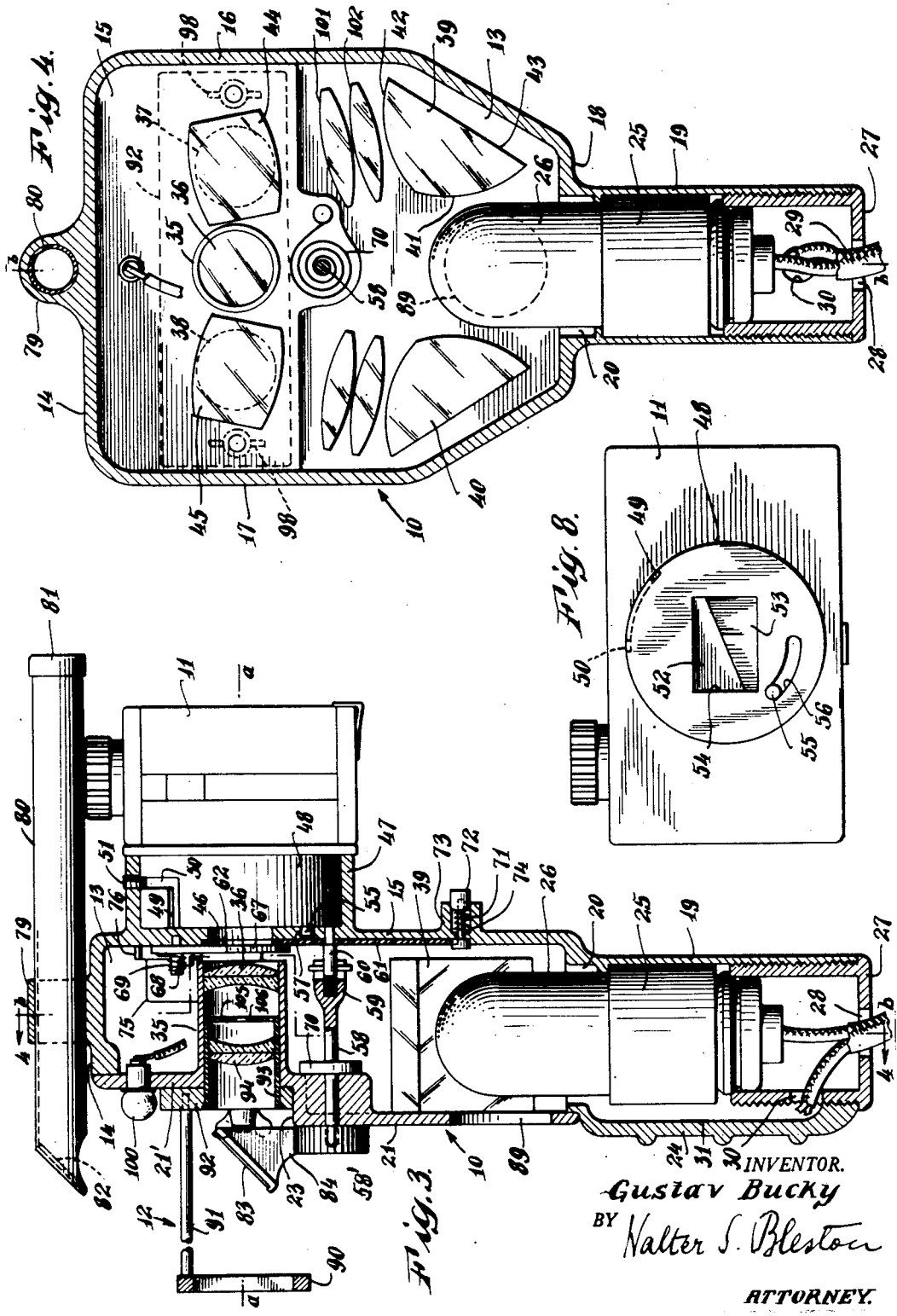

Patented May 12, 1953

2,638,039

UNITED STATES PATENT OFFICE 2,638,039

AUTOMATIC PHOTOGRAPHIC UNIT HAVING SYNCHRONIZED SHUTTER AND LIGHT SOURCE

Gustav Bucky, New York, N. Y.

Application February 4, 1952, Serial No. 269,793

6 Claims. (Cl. 95—11.5)

1

This invention relates to a photographic unit. It is an object of the invention to automatize or at least greatly simplify the act of taking scientific and technical photographic records, and thus to eliminate the otherwise required skill of the operator. The invention aims to provide a photographic unit which is very handy, light and easy to manipulate so that it can be operated with one hand, leaving the use of the other hand free for the performance of other manipulations during the time of exposure and rendering the use of a tripod or stand superfluous.

It is another object of the invention to provide a photographic unit including a light source, which owing to its small size and weight, its simplicity, and the shortness of required exposure time, allows the taking of pictures without much preparation which otherwise would require a good deal of skill, time and effort or even might be impossible for one of these reasons.

The invention also aims to make use of the light from the source incorporated in the unit to an especially high rate. As disclosed in my copending U. S. application Serial Number 153,447, filed April 1, 1950, the rays emitted from opposite sides of the light source are reflected upon the object to be photographed. According to the present invention, means are provided to render the rays of a third area of the source additionally useful.

A still other object of the invention is the provision of a photographic-unit which is fool proof in the hand of the user. In the above mentioned application Serial Number 153,447 fool-proofness is obtained by mechanical means for the adjustment of the distance of the light sensitive film from the objective. According to the present invention that distance remains constant, means being applied whereby, similar to an invention disclosed in a U. S. application filed by Frank G. Back on August 10, 1950, Serial Number 178,722, now Patent Number 2,590,916, issued April 1, 1952, different objectives or parts of objectives are provided for different purposes.

The invention further contemplates the provision of means for synchronizing the illuminating flash with the opening of the objective by a shutter system which operates a switch for the energization of the flashing light source at the instant the shutter is open.

Further objects and details of the invention will be apparent from the description given hereinafter, and the accompanying drawing illustrating an embodiment thereof by way of example.

In the drawing,

2

Fig. 1 is a front view of a camera according to my invention and with the shutter in released position;

Fig. 2 is a side elevation thereof;

Fig. 3 is a section on a larger scale along line 3—3 of Fig. 1, the shutter being shown in the cocked position;

Fig. 4 is a diagrammatic section along line 4—4 of Fig. 3, showing the arrangement of the light-reflecting means;

Fig. 5 is a front elevation of the shutter system and light switch, in the cocked position;

Fig. 6 is a view similar to Fig. 5 with the shutter in the released position;

Fig. 7 is another view similar to Fig. 5 at the moment of an exposure and of the operation of the switch; and Fig. 8 is a front view of the camera back which contains the sensitive film or plate.

Referring now to the drawing, the unit comprises three major parts, viz. the body 10 containing objective, lighting and shutter means, the camera back 11 constituting the holder for the light-sensitive film or plate (not shown), and the adapter 12 being one of a set of a plurality of different adapters each of which includes means determinative of the area to be photographed and of the distance of that area from the objective, and furthermore optical means to adapt the objective according to that distance, and also means for directing the rays from the light source within the body 10 upon the area to be photographed. In the illustrated embodiment the camera back 11 is a detachable attachment of the body 10. However, this is not necessarily so; that means, body 10, and camera back 11 may be made in one piece. It is also to be noted that an adapter need be applied only for close-up exposures, whereas for an infinite range merely body 10 and camera back 11 with the parts contained therein are required.

The body 10 in the front elevation of Fig. 1 has a shape similar to a paddle. It comprises a housing portion 13 having a top wall 14, rear wall 15, side walls 16 and 17, and bottom wall 18. The bottom wall has a tubular extension 19 the interior of which communicates with the interior of the housing through an opening 20 in the bottom wall 18. The housing portion 13 is closed in front by a cover 21 which may be screwed to the side walls 16 and 17 as indicated at 22. For a purpose which will be explained hereinafter, the cover or front wall 21 may be provided with a step 23 as clearly shown in Fig. 3. The tubular extension 19 has a rib-like corrugated projection 24 to furnish a secure finger hold when the body 10 is gripped by the user's hand encircling the tubular extension 19. A socket 25 for a flash bulb 26 is located in the tubular extension 19 and secured by a cap 27 screwed into the lower end of that extension so that the bulb projects through the opening 20 into the housing 13. The cap 27 is provided with a bottom hole 28 for a cable 29 containing the wires conducting current to the socket 25, and with a lateral hole 30 communicating with an inner groove 31 formed by the aforementioned rib 24. Through the hole 30 and groove 31 wires may be run from the socket 25 to a switch 75 in the housing which will be described hereinafter.

Closely above the step 23, the cover is provided with a tubular projection 35 extending towards the rear housing wall 15 and forming a mount for a lens 36 located near the rearward end of the mount 35 which is open in front of the cover 21. The axis $a-a$ of the lens mount 35 intersects the axis $b-b$ of the tubular extension 19 at right angles, and both axes define a plane of symmetry of the housing body 10. An optical system is provided to direct light rays from opposite sides of the flash bulb 26 in paths symmetrical with respect to the mentioned plane to two openings 37 and 38 provided on both sides, respectively, of the cover 21. The type of the optical system applied is immaterial. However, it is desirable that the rays emitted through the openings 37 and 38 are collected as much as possible but cover the entire area which can be photographed by means of the lens 36 on a film or plate within the camera back 11. A suitable system for that purpose is more fully described in the above mentioned U. S. application for patent filed by Frank G. Back on August 10, 1950. In the present embodiment the optical system is diagrammatically shown in Fig. 4 where it comprises a pair of prisms 39 and 40 each having two curved faces 41 and 42 and one plane face 43. The curvature of the faces 41 and 42 is such that the prisms act as condensors as well as reflectors. The prisms are so located that light rays from the flash bulb 26, having passed the faces 41 will be reflected by the faces 43 through the faces 42 towards another pair of prisms 44 and 45. This second pair is located on the same level as the lens 36 and in registry with the openings 37 and 38, respectively, so that the light rays received by the prisms 44 and 45 will be projected through the mentioned openings. Between prisms 39 and 44 and also between prisms 40 and 45, lenses such as shown at 101 and 102 may be located, so that the optical systems of the prisms and coordinate lenses 101 and 102 have the same focal length as the lens 36.

In the rear of lens 36, a hole 46 is provided in the housing wall 15 from which a tubular extension 47 projects rearwardly and coaxially with lens 36 and hole 46. The extension 47 serves for the attachment of the camera back 11 which may be connected to the part 10 either permanently or removably as in the case of the present embodiment. In that case a connector piece 48 is secured to the camera back 11 and fits into the housing extension 47. The connector is provided on its outside with a groove having an axial arm 49 and a peripheral arm 50, and the extension 47 is provided with an inwardly projecting pin 51 for engagement with the groove 49, 50 in the manner of a bayonet fastening. The connector 48 includes a shutter comprising two plates as shown in Fig. 3, 52 and 53, covering an opening 54 when the camera back 11 is disengaged from the housing 10. The shutter can be opened, i. e. the plates 52 and 53 can be withdrawn from the opening 54 by shifting a pin 55 from the one end of a curved slot 56 to its other end. As a shutter of the mentioned kind is known in the art and not a part of the present invention no detailed description of its structure seems to be required. When the camera back 11 is to be connected with the housing 10, it is first to be applied in such a relative position that pin 51 engages the axial groove 49. It is, then, pushed home until the pin 51 is located in the knee formed by the axial groove 49 and peripheral groove 50. In this position of the parts the shutter pin 55 fits in a hole or indentation 57 of the housing wall 15. Thereupon the camera back 11 is turned as far as pin 51 in the peripheral groove 50 permits. Simultaneously pin 55 is retained in the indentation and, thus shifted in relation to the part 48 to the other end of the slot 56 thereby opening the shutter 52, 53.

Another shutter system is provided with respect to the opening 46. This system comprises a shaft 58 which is journaled in the cover 21 of the housing underneath the lens mount 35. The shaft 58 can be turned by a knob 58' secured to it outside the cover 21. The inner end of shaft 58 forms an axially slotted socket 59 engaged by and coupled with a short coaxial shaft 60 which is journaled in the housing rear wall 15. If the structure permits it, shafts 58 and 60 may be one piece. A shutter disc 61 is secured to the shaft 60 and provided with an opening 62 which can pass in front of the opening 46 when shaft 60 rotates. The disc 61 is further provided with a recess 63 in its periphery, into which the head 64 of a release button can engage when the disc is in the cocked position illustrated in Fig. 5. In order to limit the rotation of the disc to a desired angle, for instance about 135° as in the present case, a stop can be provided e. g. by a peripheral projection 65 which abuts against the shank of head 64 in the released position (Fig. 6) of the disc. A pin 66 is so arranged at a small angular distance from the opening 62 that it precedes the latter upon a counter-clockwise rotation of the disc in Fig. 5. The pin 66 controls a capping device which comprises a plate sector 67 pivoted at 68 to the housing rear wall above the disc 61. The sector 67 is so biased by a spring 69 that in its normal position the sector is located between the disc 61 and the lens mount 35 in the path of rays from the lens 36 to opening 46. Pin 66 is so arranged that it can engage the sector 67 and shift it out of registry with the opening 46. When the disc will be turned into cocked position, that means in a clockwise direction from the position of Fig. 6 into that of Fig. 5, the opening 62 will pass the opening 46 before pin 66 engaging the sector 67 will swing the latter to the right hand side until pin and sector become disengaged whereupon the sector with or without the aid of the spring 69 will return to its normal position. Thus during such movement of the disc the opening 46 will be permanently covered either by the disc or by the sector or by both. If, however, the disc is turned in the opposite direction, pin 66 will engage the sector 67 and shift it to the left before opening 62 registers with opening 46. By correctly selecting the shape of the sector 67, the radius on which the pin 66 is located, and the angular distance of the pin from opening 62 it can be attained that the sector will be fully withdrawn from opening 46 when the openings register.

In order to operate the shutter, a spring 70 is secured with its ends to the shaft 58 and the cover 21 so as to return the disc from the cocked to the released position. The releasing device comprises the aforementioned head 64 with shank 71 and push button 72 projecting from a little boss 73 on the rear wall 15 of the housing. A spring 74 located within that boss tends to push the button outward. In the released position with the push button 72 pressed inward against the restraint of spring 74, the periphery of the disc 61 is located between the head 64, the shank 71 and the wall 15. When upon cocking of the shutter the disc 61 will be turned against the restraint of spring 70 so that the recess 63 registers with the head 64, the latter will be withdrawn by spring 74 to enter into the recess and to lock the disc in the cocked position as shown in Figs. 3 and 5. It is to be noted that the push button for the shutter release is located in the aforementioned plane of symmetry of the housing 10 and at the lowermost point of the disc 61. This location renders it possible to operate the push button with the thumb of the same hand, regardless whether it is the user's right or left hand, which grips the tubular housing extension 19 with the other four fingers while making an exposure.

The aforementioned sector 67 which serves as a capping device has another task in that it operates a switch 75 for the flash bulb 26. The switch is secured to the inside of the housing somewhat above the disc 61 and on that side of the sector 67 to which the latter is swung upon the release of the shutter from cocked position. The switch is operative by a pivoted arm 76 which is in the path of the sector 67 and can be turned by the latter. The operation of the switch 75 closes the current of the flash bulb 26, and arm 76 of the switch is so formed that the current will be closed exactly at the time disc opening 62 is in registry with the opening 46.

Viewing means are provided which preferably consist of a view finder tube 80, an eye piece 81 at its one end, and a reflecting member 82 at the other end. The tube 80 is held in an eye 79 on top of the housing wall 14. The reflecting member 82 has its reflecting face inclined 45° downward with respect to the horizontal and is located in the aforementioned plane of symmetry of the housing. Another inclined reflector 83 is secured to the shutter knob 58' so that it is in opposition to the reflector 82 when disc 61 is in cocked position. An arm 84 which connects the reflector 83 with the knob 58' is so long that the center of the reflector 83 coincides with the axis a—a in that position. If, however, the shutter disc 61 will be released reflector 83 will be taken along by the disc shaft 58 so that the lens 36 is unobstructed during an exposure. The reflectors 82 and 83 may be either plane mirrors or prisms having each one plane and two curved surfaces. A small light bulb 100 may be provided in the housing front above the lens mount 35 to furnish light when the view finder is used. This bulb may be so connected that it burns permanently as long as cable 29 is connected to a source of current.

Provided the optical system for projecting light rays is correctly selected with respect to the focal distance of the lens 36 the unit so far described consisting of the housing 10 with the camera back 11 and the parts contained therein is useful for infinite distance exposures without further attachment. As it has been stated hereinbefore the output of the flash bulb 26 is utilized to a large extent owing to the symmetrical arrangement of the optical system for projecting light rays from two opposite sides of the flash bulb. The invention contemplates still further utilization of the flash bulb light for infinite distance exposures by providing a window 89 in the front cover of the housing part 11. This window renders it possible to utilize rays emitted by the bulb directly forward from the camera. The window 89 remains unobstructed all the time as the view finder reflector 83 moves only between a position vertically above the window and a position approximately 135° from the vertical as shown in Fig. 1. In order to render the unit fool-proof in the hands of a user, for close-up exposure, a set of adapters 12 may be provided. Each adapter comprises a frame or other portion 90 which is determinative of the area to be photographed. Frame 90 is rigidly connected by bars 91 to a plate like piece 92 from the center of which a tubular extension 93 projects in the direction opposite the frame 90. The tubular extension 93 fits into the tubular mount 35 of the lens 36, and forms the mount for a front lens 94. Lens 94 is so selected that it constitutes together with lens 36 a lens system having a focal distance in proper relation to the length of the rod 91, the size of the frame 90, and the distance of the camera back 11 from lens 36. In other words if an adapter is correctly positioned with its extension 93 within the lens mount 35 and plate 92 bearing against the upper portion 21' of the housing cover 21, the lens system 36, 94 will be capable of producing on a light sensitive film or plate in the camera back 11 a clear picture of an object upon which the frame 90 is placed, wherein the picture will correspond to the area defined by the frame. On the opposite sides of the tubular extension 93, the plate 92 is furthermore provided with optic wedges 95 and 96 positioned in front of the openings 37 and 38, respectively, when the adapter is correctly applied. The wedges are so selected that light rays reflected by the prisms 44 and 45 through the openings 37 and 38 will be projected by the wedges upon the area defined by the frame 90. In order to insure the correct position of the plate 92 the aforementioned step 23 of the front cover 21 is provided on which the plate can bear with its lower edge 97, while thumb screws 98 secure the plate to the housing 10.

As the light output of the flash bulb is a given quantity, the illumination of the area, defined by the adapter frames will differ according to the distances of the frames from the lenses 94, i. e. according to the lengths of the bars 91. For this reason each adapter is provided with a diaphragm having an opening larger or smaller as the bars of the adapters of a set differ in length. In the illustrated embodiment the tubular mount 93 has, for that purpose, an end wall 105 with a diaphragm opening 106 which is so selected that the correct quantity of light will pass on to the camera back 11.

In order to operate the unit according to the invention, the user will select an adapted 12 best suited the object to be photographed. While the shutter disc 61 is in the released position and consequently the view finder 83 in its lower position below the step 23, the adapter can be shifted with its tubular extension 93, i. e. the mount of the front lens 94 into the mount 35 of the rear lens 36 whereupon the thumb screws 98 may be tightened. It will be noted that the diaphragm 105 is now located between the lenses 94 and 36.

The location of the diaphragm opening 106 in relation to lenses 36 and 94 is predetermined and may be selected according to the requirements by making the length of the tube 93 between the lens 94 and the end wall 105 longer or shorter. The camera back 11 with the unexposed film or plate therein may be attached to the housing 13 in the manner hereinbefore described, prior to or after the attachment of the adapter. When both the adapter and the camera back are affixed to the housing, shutter knob 58' may be turned to cock the shutter whereby the mirror 83 is moved into its position in front of the lens system. The unit may now be held by one of the user's hands at the grip 19 and be applied to the object with the frame 90 encompassing the area to be photographed. The view finder may be used to correct the position of the frame especially if caverns or cavities are to be photographed in which event the bulb 100 may furnish the necessary light. When the frame is in its correct position, the thumb of the hand holding the grip 19 may press the button 72 to release the shutter disc 61 whereby the capping sector 67 will operate the switch 75 of the flash bulb 26 exactly at the moment when the disc opening 62 registers with the opening 46 of the housing rear wall 15. As the shutter 52, 53 is open when the camera is attached the flash of the bulb 26 will cause the desired exposure.

The electric wiring within the part 10 and grip 19 has not been shown in the drawing in order to prevent overcrowding thereof. The wiring may be provided according to any suitable and conventional type of circuit.

It will be apparent to those skilled in the art that many alterations and modifications of the structure shown and described are possible without departure from the essence and spirit of the invention which for that reason shall not be limited but by the scope of the appended claims.

I claim:

1. In a unit including an objective lens and a lamp for illuminating an object to be photographed, the combination of a housing including a mount for said lens and tubular extension of the housing body constituting a grip for one of the user's hands to hold said camera during exposures, said lamp being mounted in said extension so as to project into said housing and to emit light rays through openings in the housing wall, a switch for said lamp and a shutter device accommodated in said housing, said shutter device including a shutting member and a capping member, said capping member having a position of rest and being reciprocable from said position in one direction so as to obstruct the path of rays passing said objective lens, and being reciprocable in the opposite direction so as to operate said switch, means tending to return said capping member to said position of rest, means to cock said shutting member, means to release said shutting member, said last mentioned means being so located as to be operative by said hand holding said grip, and a follower means connected to said shutting member and engageable with said capping member so as to shift said capping member in said one direction and then to release it during the cocking of said shutting member, and to shift said capping member in the other direction and, then, to release it during the release of said shutting member from cocked position.

2. A device as claimed in claim 1, said shutting member being a rotatable disc with a hole therein so as to pass said path of said rays when said disc is turned, said capping member being a plate pivoted to said housing, and said follower being adapted to engage the rim of said plate from the one or the other side depending on the direction in which said disc is turning.

3. A device as claimed in claim 1 further comprising viewing means including a member having a reflecting surface inclined with respect to the axis of said objective, said reflecting member being connected to said shutting member for common movement so as to be positioned in front of said objective when said shutting member is cocked and to be removed from its said position when said shutting member is being released.

4. A device as claimed in claim 1 wherein said shutting member consists of a disc and a disc shaft journaled in said housing and projecting with one of its ends therefrom, said cocking means being attached to said shaft end, said device further comprising viewing means including a member having an inclined reflecting surface and being connected to said shaft so as to be in a position in front of said objective when said shutter disc is in its cocked position and to be remote from said objective when said shaft is turned into released position.

5. In a photographic unit including an objective and a carrier for a light-sensitive surface, the combination of a housing having a front wall, a rear wall, and a tubular extension of its bottom constituting a grip for one of the user's hands during exposures, said housing including a mount for said objective and means for the attachment of said carrier in registry with an opening of said rear wall, a shutter disc between said mount and said rear wall, a shutter disc shaft journaled in said front and rear walls in spaced but parallel relationship to the axis of said mount, said disc being provided with a hole which passes said rear wall opening when said shaft rotates, resilient means connected to said shaft and tending to turn said shaft in one direction, a knob secured to one of the ends of said shaft to turn it by hand against the restraint of said resilient means into a cocked position of said shutter, a capping device reciprocably attached to said housing and having a position of rest in which said rear wall opening is covered by it and being so shiftable that said rear wall opening is uncovered by it, said capping device being biased so as to take its position of rest when released, means connected to said disc to engage said capping device upon a turn of said shaft for cocking said shutter disc, thereby to take said capping device along so as to cover said rear wall opening when said disc hole approaches said opening and to release said capping device when said hole has passed said opening, a detent for holding said disc in its cocked position, and a push button for releasing said detent, said push button being operative by the thumb of the hand holding said grip.

6. A photographic unit comprising a housing including an extension of its bottom, said extension constituting a grip for one of the user's hands to hold said camera during exposures, an objective mounted in said camera, a rotatable shutter in the rear of said objective, a shaft for said shutter extending with one of its ends through the front wall of said housing underneath said objective whereby a torque may be applied to said end for cocking said shutter, a push button device for releasing said shutter from cocked position, said push button being so located as to be operative by the thumb of said hand holding said grip, an adapter adapted to be attached to said housing in front of said objective, view finding means including an element having a reflecting face in a plane inclined with respect to the objective axis, said element being secured to said shaft end, and having one position in front of said adapter when the latter is attached and said shutter is cocked, and another position in which it is below said adapter when said shutter is released.

GUSTAV BUCKY.

References Cited in the file of this patent

UNITED STATES PATENTS

| Number | Name | Date |
| --- | --- | --- |
| 2,586,973 | McMillin | Feb. 26, 1952 |
| 2,590,916 | Back | Apr. 1, 1952 |